United States Patent [19]

Theodoru et al.

[11] 4,288,780
[45] Sep. 8, 1981

[54] PATTERN RECOGNITION SYSTEM

[76] Inventors: Alexander S. Theodoru, 210 Thames St., New London, Conn. 06320; Stefan G. Theodoru, 28-18 29th St., Long Island City, N.Y. 11102

[21] Appl. No.: 57,098

[22] Filed: Jul. 12, 1979

[51] Int. Cl.³ .............................................. G06K 7/14
[52] U.S. Cl. .............................. 340/146.3 Z; 235/460; 340/149 R
[58] Field of Search ................... 340/146.3 Z, 146.3 F, 340/149 R, 149 A; 235/460, 458, 459; 250/568

[56] References Cited

U.S. PATENT DOCUMENTS

| | | | |
|---|---|---|---|
| 2,723,308 | 11/1955 | Vroom | 340/146.3 Z |
| 3,044,695 | 7/1962 | Burr et al. | 340/146.3 Z |
| 3,736,410 | 5/1973 | Ragland et al. | 235/460 |
| 3,812,326 | 5/1974 | Galy | 235/460 |
| 3,840,857 | 10/1974 | Knight et al. | 340/146.3 AC |
| 4,128,757 | 12/1978 | Garner, Jr. | 235/460 |
| 4,136,820 | 1/1979 | Collado et al. | 235/460 |
| 4,140,272 | 2/1979 | Atalla | 235/460 |

Primary Examiner—Leo H. Boudreau
Attorney, Agent, or Firm—Jim Zegeer

[57] ABSTRACT

A pattern recognition system for protecting against the theft of automobiles, the unauthorized opening of doors, the unauthorized opening of other items such as brief cases and the like is disclosed. The system of this invention includes a matrix card having a matrix array, a card reader and a comparator. Elements of the array on the card are perforated to provide a coded pattern on the card. The reader senses these perforations and senses those elements of the array that are not perforated. The output of the reader is applied to the comparator which is pre-set according to the code on the matrix card. If the pre-set code in the comparator matches the code on the card, the comparator provides a positive recognition output signal.

22 Claims, 12 Drawing Figures

PATTERN RECOGNITION SYSTEM

BACKGROUND OF THE INVENTION

This invention relates to pattern recognition systems; and more particularly, to an integrated electronic system for recognizing and accepting a predetermined code pattern. When the code pattern is recognized and accepted, the system of this invention produces a recognition signal which can in turn activate any other other system (mechanical, electrical, etc.). The system of this invention provides a highly accurate releasing device able to serve locks, tripping devices, coding systems and the like.

Various different schemes for replacing conventional door lock keys and the like with coded systems have been devised. Such prior art systems are disclosed in the following U.S. Pat. Nos.

3,029,345, Douglas
3,154,761, O'Gorman
3,221,304, Enikeieff et al
3,239,815 Martens
3,419,881, Yamamoto
3,564,500, Cook
3,622,991, Lehrer et al
3,694,810, Mullens et al
3,742,453, Doyle
3,763,676, Schachter et al
3,781,805, O'Neal, Jr.
3,821,704, Sabasy
3,822,396, Watase et al
3,842,629, Pazer et al
3,845,361, Watase et al
3,906,447, Crofton
3,926,021, Genest et al A study of the systems disclosed in the above listed patents discloses that many of the patented systems are very complex systems that require counters, multiplexers, clocks, etc. In addition, some of the systems disclosed in the more recent patents require central processing units. Further, some of the prior art systems rely on cards coded with magnetic strips which are susceptible to alteration by heat rays as stray magnetic fields. Still other prior art systems are combination mechanical-electrical systems that require a substantial amount of power to operate the system. Further, in many of the prior art systems changing of the code is not readily accomplished. Also, the prior art code recognition systems are generally designed for large industrial or commercial or office use and, therefore, are either too expensive or too complex for use by the general consumer. That is, these prior art systems are not designed for the regular consumer market.

The pattern recognition system of this invention is relatively inexpensive, can be readily minaturized, is designed for purchase and use by the general public and provides a coded system in which the code can be readily changed to a new code. Further, the system of this invention provides an extremely large number of different code combinations.

SUMMARY OF THE INVENTION

The system described by this invention can be viewed as being formed by three distinct functional elements which, when energized, can function as a lock, tripping device, coding system and so on. These three elements are: the matrix card, the reader (the matrix card reader), and the comparator.

Depending on the application, the functional elements can be either fixed or detachable.

The system compares the received pattern, printed on the matrix card, with a pattern previously selected by the comparator. This comparison is accomplished by inserting the matrix card in the reader, which, in turn, transmits the pattern printed on the matrix card to the comparator. If the two patterns match exactly, the comparator will send a positive recognition signal. Otherwise a negative necognition signal will be sent. This negative signal can be used to trigger an alarm or register a tampering with the system, but will not operate to release the lock or other mechanism to which the system is applied.

The pattern printed on the matrix card can be more or less complex, depending on the size of the array available (on the matrix card). Even for a system for which a small size array is used, without prior knowledge of the exact pattern, the chances of duplicating the pattern on the card is one in a few billions. In a medium sized system where the array size is, for example, 60, the chances of a correct duplication is one in over a million of trillions.

BRIEF DESCRIPTION OF THE DRAWING

A complete understanding of the details of the invention can be obtained from the following detailed description when read in conjunction with the annexed drawing in which:

FIG. 1 represents the three basic elements of a preferred embodiment of the invention;

FIG. 2(a) is a top view of a matrix card constructed in accordance with this invention;

FIG. 2(b) is a cross-sectional view of the matrix card of FIG. 2(a);

FIG. 2(c) is a top view of the matrix card showing an example of a code pattern on the card;

FIG. 3 is a partial cross-sectional view of the photodiode embodiment of the card reader of the invention;

FIG. 8 illustrates how the system of this invention may be used to protect an automobile;

DETAILED DESCRIPTION OF THE INVENTION

Referring to FIG. 1, the figure shows the basic elements of a preferred embodiment of the pattern recognition system of this invention. As shown in FIG. 1, the invention includes a matrix card 1, a card reader 2 and a comparator 3. Comparator 3 is electrically coupled to the reader 2 by means of the buss line 4.

In FIG. 1 matrix card 1 has a 9×10 array. FIGS. 2(a) and 2(c) show other suitable matrix cards. FIG. 2(b) is a cross section of the card of FIG. 2(a). Matrix card 5 of FIGS. 2(a) and 2(b) has a 6×10 array. FIG. 2(a) is a top view of the matrix card 5. The numerals 1 through 10 are shown along the long side of the array and the letters A through F are shown along the short side of the array. Using these letters and numbers, card 5 contains the following code or pattern; A5, B2 B8, C3, D6, D9, E2, E4, E5 and E9. This pattern or code is imprinted on card 5 by merely punching holes through card 5 in accordance with the pattern or code given above. FIG. 2(b) is a cross section of card 5 showing a portion of the code.

In any matrix card constructed in accordance with this invention, the available complexity of the pattern or code is directly related to the size of the matrix on the card. The 6×10 matrix card 5 allows $2^{60} = 1,152, 921, 504, 606, 840, 976$ combinations. The probability that the pattern in matrix card 5 can be deduced without prior knowledge is very small. In the particular case of matrix card 5, the probability is $0.86 \times 10^{-19}$.

FIG. 2(c) is a top view of another matrix card constructed in accordance with this invention, the matrix card 7. Matrix card 7 has a 20×50 array and, therefore, provides more possible code combinations than matrix card 5. Further, matrix card 7 also illustrates other forms of code patterns that can be provided on matrix cards of this invention. As shown in FIG. 2(c), the code on matrix card 7 includes the numerals 1, 2, the letters A, T and the figure of a cube. Any other desired pattern or code can be provided on a matrix card such as card 7.

The matrix card with its code or pattern is inserted into the slot 6 of matrix card reader 2 of FIG. 1. Matrix card reader 2 with matrix card 5 inserted in reader 2 is shown in cross section in FIG. 3. Reader 2 of FIG. 3 is a photodiode reader that includes an array of light emitting diodes 8 and a corresponding array of photodiodes 9. Only one row of light emitting diodes (LED) 8 and one row of photodiodes 9 are visible in FIG. 3. However, for each element in the array of matrix card 5, there is a corresponding LED 8—photodiode 9 pair. When the on-off switch 11 is turned on, the entire system is energized.

The cross section of card 5 shown in FIG. 3 is the same as the cross section shown in FIG. 2(b). Thus, referring to FIG. 2(a), the perforations 2E, 4E, 5E and 9E are visible in FIG. 3. The light from the LED's 8 corresponding to the 2E, 4E, 5E and 9E pattern or code perforations impinges on its associated photodiode 9 that receives light from its associated LED 8 provides an output signal. In FIG. 3 all the photodiodes 9 except those beneath a perforation are shielded from their respective LED 8 by matrix card 5 which is opague except in the area of a perforation. Thus, wherever a perforation or hole appears in the array of matrix card 5, the associated photodiode 9 will receive radiated energy from its corresponding LED 8 and provide an output signal while all other photodiodes 9 remain dark.

In order to prevent cross-talk between an LED 8 and its adjacent photodiodes 9, the opague shielding walls 10 are provided.

Figure 4:
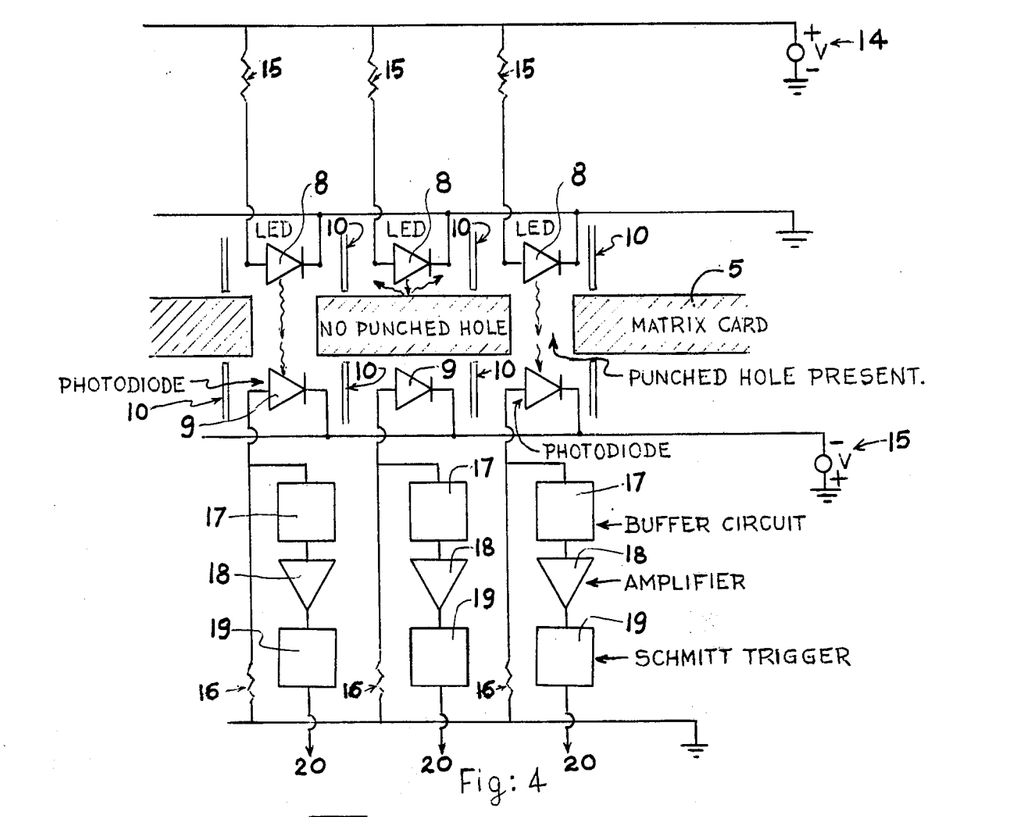
FIG. 4 is a partial circuit diagram of the reader of FIG. 3.

In FIG. 3 the electronic circuitry of the reader is shown as the rectangle labelled with the numeral 12. FIG. 4 is a schematic of this circuitry for three of the LED 8—photodiode 9 pairs. The circuitry for each of the remaining pairs is identical to that shown for each pair in FIG. 4. As shown in FIG. 4, one end of each LED 8 is connected to ground while the other end of each LED 8 is coupled to a source 14 of positive voltage through separate resistors 15. One end of each of the photodiodes 9 is connected to a negative voltage source 15 while the other end of each photodiode 9 is coupled to ground through a separate resistor 16. Considering the left-most LED 8—photodiode pair 9 in FIG. 4, the said other end of this photodiode 9 is coupled to the input of the buffer circuit 17, the output of buffer circuit 17 is applied to the input of the amplifier 18 and the output of amplifier 18 is applied to the input of comparator 3. As is apparent from FIG. 4, the circuitry of the other two cells or LED 8 photodiode 9 pairs is identical to the circuitry just described and, as described, includes a buffer circuit 17, an amplifier 18 and a Schmitt trigger 19 having an output 20 coupled to the input of comparator 3. All of the cells or LED 8—photodiode 9 pairs of reader 2 include identical circuitry.

For each photodiode 9 that receives radiation from its associated LED 8, the Schmitt trigger of that cell of the array will provide a "1" ("0") logic output. For each photodiode 9 that does not receive any radiated energy, the output of the associated Schmitt trigger will be a "0" ("1") logic level signal. The output signals from the Schmitt triggers 19 are coupled to comparator by means of buss line 4.

Figure 5:
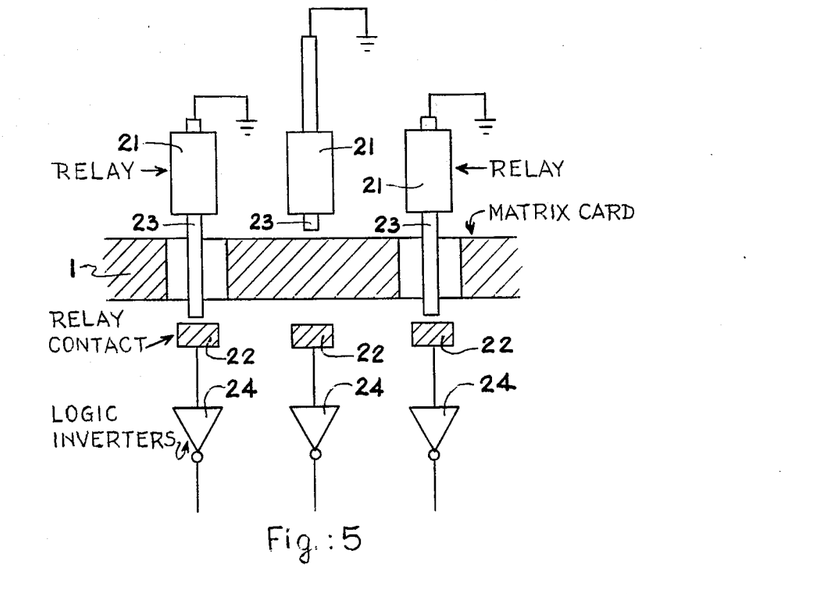
FIG. 5 represents a relay embodiment of the reader of the invention.

FIG. 5 shows another embodiment of reader 2. In this embodiment reader 2 contains an array of relays 21 and a corresponding array of rely contacts 22 in place of the array of LEDs 8 and photodiodes 9 of the FIGS. 3 and 4 embodiment. Thus, each relay 21 has an associated relay contact 22. When a matrix card is inserted into reader 2, the plunger 23 of each relay 21 that is aligned with a perforation or hole in the matrix card passes through the hole and makes contact with its associated relay contact 22. All other plungers 23 of relays 21 are blocked from contact with their associated relay contact 22. Each relay contact 22 is connected to the input of a logic inverter 24. For each cell in which plunger 23 closes on its associated relay contact 22, the logic inverter 24 of that cell provides a "1" logic level signal and for each cell where plunger 23 is blocked from its associated relay contact 22, the logic inverter 24 of that cell provides a "0" logic level output.

Figure 6:
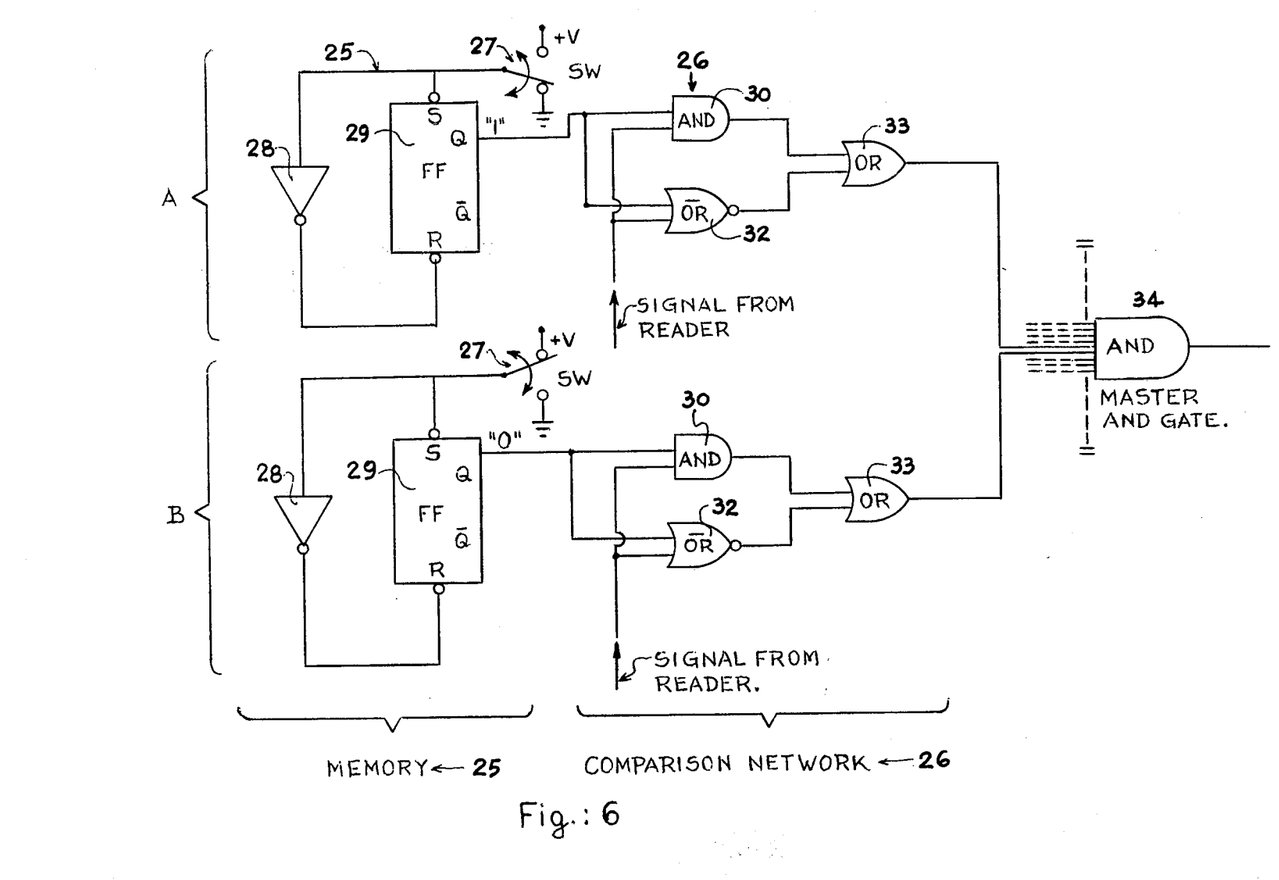
FIG. 6 is a partial circuit diagram of a preferred embodiment of the comparator.

For each matrix array element in a matrix card and for each cell in reader 2, there is corresponding comparator cell in comparator 3. FIG. 6 shows the circuitry of two cells in comparator 3. All cells contain identical circuitry. As shown in FIG. 6, each cell of comparator 3 contains a memory circuit 25 and a comparison network 26. Each memory circuit includes a two position switch 27. In one position, switch 27 is coupled to ground and in the other position switch 27 is coupled to a source of positive voltage. Each switch 27 corresponds to an element of the array of matrix card 2. In addition to switch 27 each memory circuit 25 includes an inverter 28 and a flip-flop 29. Each comparison network 26 includes an AND gate 30, an inverted OR gate 32, and an OR gate 33.

Referring back to memory circuit 25, the arm of each switch 27 is connected to the S-pin of its associated flip-flop 29 and to the input of its associated inverter 28. The output of each inverter 28 is connected to the R-pin of its associated flip-flop 29. When a switch 27 is coupled to ground, the S-pin of that flip-flop 29 will be at ground ("0") level. This insures a "1" logic level at the Q-pin of that flip-flop 29 and a "0" logic level at the $\bar{Q}$-pin. When a switch 27 is coupled to the positive source of voltage, the S-pin of its associated flip-flop is kept high, logic level "1", while the R-pin of that flip-flop is at a "0" logic level. With the S-pin at a logic "1" level and the R-pin at a "0" logic level, the Q-pin of a flip-flop 29 will be at the "0" logic level while the Q-pin will be at the "1" logic level. For each perforation in a matrix card switch 27 of the corresponding memory circuit 25 is switched to ground while all other switches 27 are switched to the positive voltage source.

Each AND gate of the comparison networks 26 has one input coupled to the Q-pin of its associated flip-flop 29 and a second input coupled to the output 20 via buss line 4 of the corresponding cell in reader 2, if the LED photodiode reader of FIGS. 2 and 3 is provided or to the output of the corresponding inverter 24 via buss line 4 if the relay embodiment of FIG. 4 is provided. One input of each inverted $\overline{OR}$ gate 32 is coupled to the Q-pin of its associated flip-flop 27 while the second input of each inverted OR gate is coupled to output 22 of the associated Schmitt trigger 19 or the output of the associated inverter 24 as the case may be. The output of each AND gate 30 is coupled to one input of the associated OR gate 33 and the other input of each OR gate 33 is coupled to the output of the associated inverted $\overline{OR}$ gate 32. The output of each of the OR gates 33 is coupled to a different one of the separate inputs of the master AND gate 34. The output of master AND gate 34 is coupled to the device being controlled such as a lock or the like.

Figure 7:
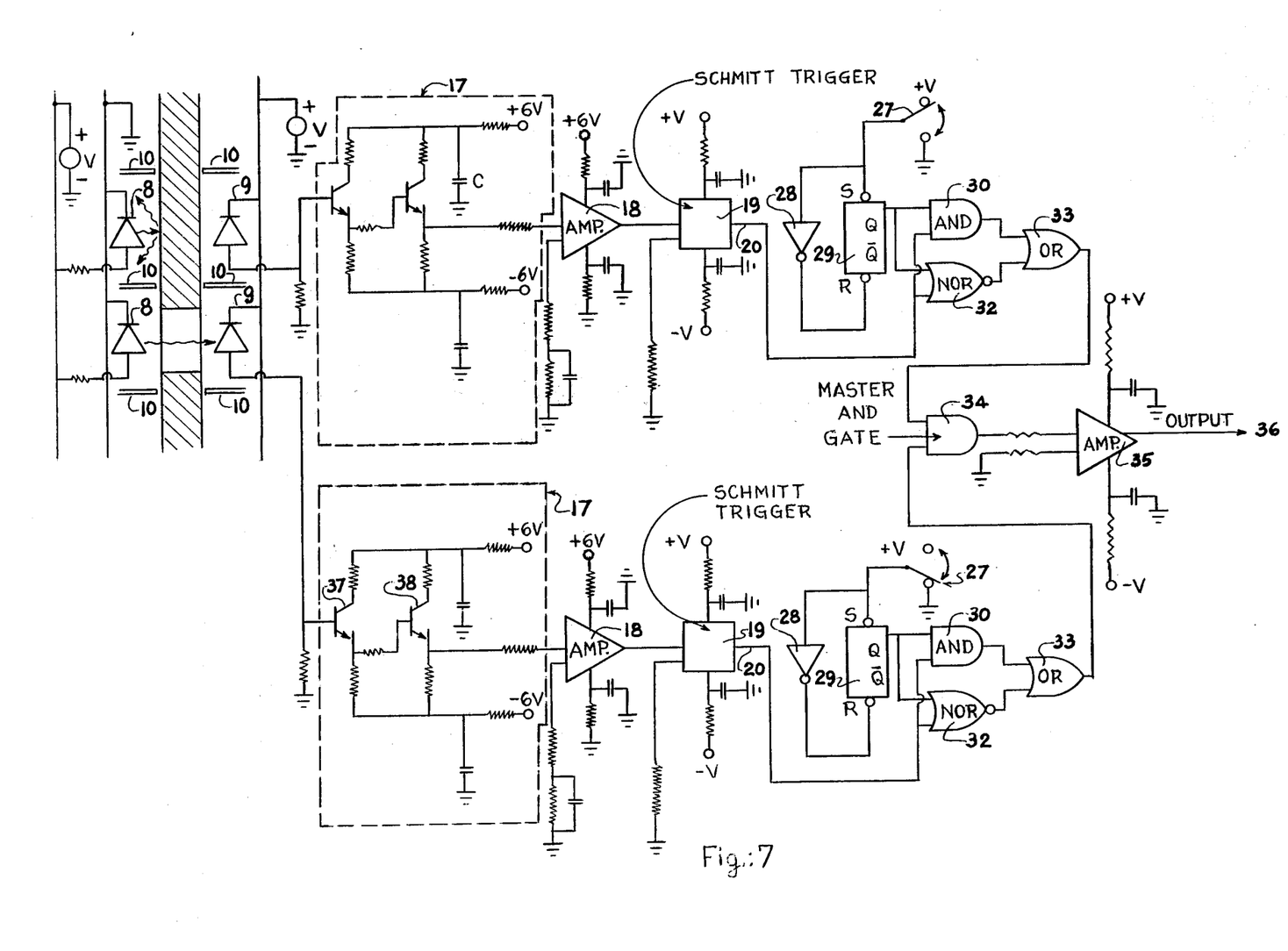
FIG. 7 is a partial circuit diagram of a preferred embodiment of the system of this invention.

FIG. 7 is a combination of FIG. 4 and FIG. 6 and, therefore, shows two cells of the LED photodiode reader 2 coupled to two cells of comparator 3. The circuitry for each cell is identical. In addition, FIG. 7 is somewhat more detailed than FIGS. 4 and 6 since various resistors and capacitors not shown in FIGS. 4 and 6 are shown in FIG. 7. Also FIG. 7 shows that buffer circuit 17 may be a circuit having a first transistor 37 and a second transistor 38 with the associated circuit elements shown. Further, in FIG. 7 the output of master AND gate 35 is coupled to one input of the amplifier 35. The output 36 of amplifier 35 is coupled to the device being controlled. In all other respects, FIG. 7 corresponds directly to FIGS. 4 and 6 taken together and like numerals are used to denote like components in the three figures.

Considering FIGS. 1, 2, 3, 4, 6, and 7, a matrix card is first coded by punching holes in desired elements of the array on card 2. All switches 27 are then set such that all switches 27 corresponding to a hole in the array on the matrix card are coupled to ground and all other switches 27 are coupled to the positive voltage source. The system is now ready to function.

The holder of the coded matrix card inserts his card into reader 2 and turns switch 11 to the "on" position. Switch 11 conveniently provides power to the entire system.

With the system powered all of the flip-flops 29 having their associated switch 27 grounded will provide a "1" logic level signal at the Q-pin while all other flip-flops 29 (those with the associated switch 27 coupled to the positive voltage source) will provide a "0" logic level signal at the Q-pin. Thus, the one input of each AND gate 30 and the one input of each inverted OR gate 32 coupled to a Q-pin where switch 27 of that cell of memory 25 is connected to ground will receive a "1" logic level signal while this same input of all the other AND gates 30 and this same input of all the other inverted OR gates 32 will receive a "0" logic level signal.

The second input of each AND gate 30 and each inverted OR gate 32 are coupled to the output 20 of the then associated Schmitt trigger 19 of reader 2. Since the output of each Schmitt trigger 19 for which there is a corresponding hole in matrix card 2 provides a "1" logic level signal and all of the other Schmitt triggers 19 provide a "0" logic level signal at their respective outputs 20, AND gates 30 and inverted OR gates 32 will have either a "1" logic level signal at both inputs or a "0" level signal at both inputs. When both inputs at AND gates 30 and both inputs at inverted OR gates 32 are the same (both "0" or both "1"), the output of OR gate 33 will be a "1" logic level signal. Under this condition, all the inputs to master AND gate 34 are "1" logic level signals and the output of master AND gate 34 is a "1" logic level signal. This signal is then applied to the device being controlled or to an amplifier such as amplifier 35 of FIG. 7, and then to the device being controlled.

If the signals on the two inputs of any AND gate 30 and inverted OR gate 32 are opposite (a "0" and a "1"), the output of the associated OR gate 33 will be a "0" logic level signal. Therefore, not all of inputs of master gate 34 will be at the "1" level and the output of master AND gate 34 will be a logic level "0" signal. With a "0" level signal at the output of master AND gate 34, the device to be controlled that is coupled to the output of master AND gate 34 as to the output master AND gate 34 through amplifier 35 will not be activated. If desired, an alarm device can be coupled to the output of AND gate 34 and be designed such that the alarm is activated when the output of master gate 34 goes to the "0" logic level.

If one desires to change the code of a given system of this invention, the new code is selected and then a new matrix card 2 is perforated in accordance with the new code. All the switches 27 and then reset to reflect this new code. The system will then only provide a "1" logic level signal at the output of master AND gate 34 only when the new card is inserted into reader 2. The old card will no longer operate the system.

Figure 9:
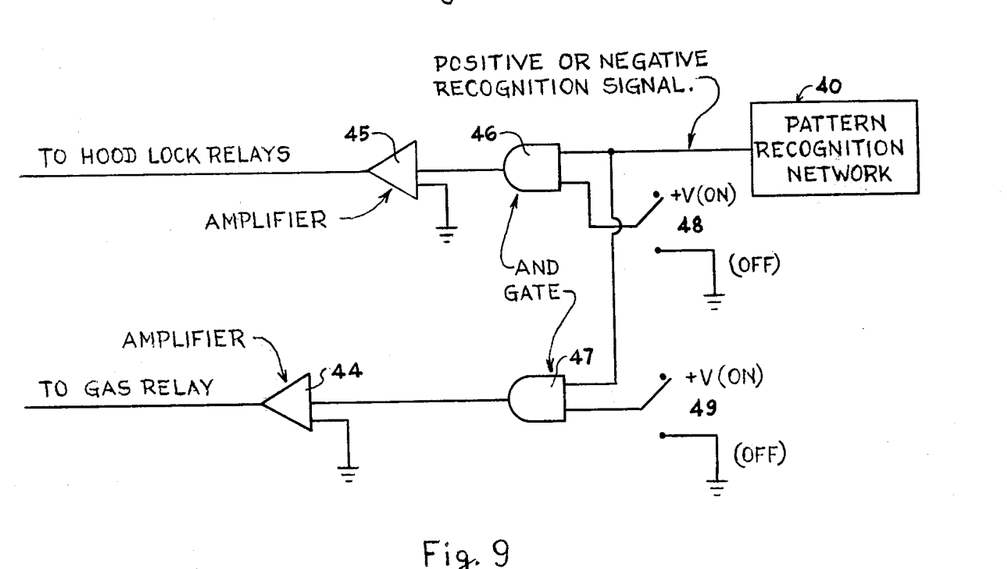
FIG. 9 is a schematic diagram showing the AND gates and amplifiers of the system of FIG. 8.
Figure 10:
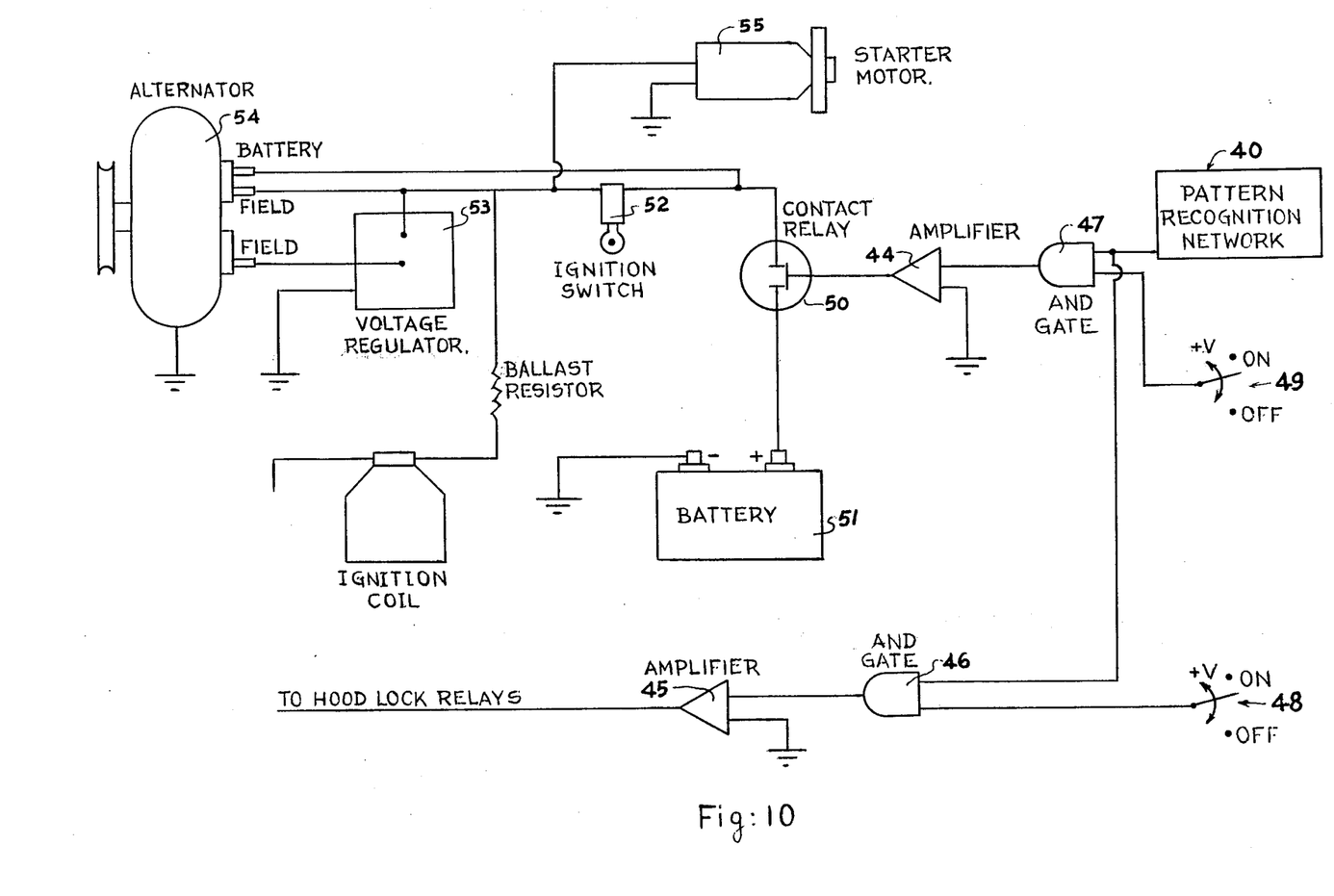
FIG. 10 illustrates a second method of using the system of this invention to protect an automobile.

FIGS. 8 and 10 show how the pattern recognition system of this invention may be used to prevent the theft of an automobile. Referring first to FIG. 8, in this figure, the pattern recognition system of this invention is designated by the single block 40. In practice when the invention is utilized in an automobile in the manner shown in FIG. 8, reader 2 is conveniently mounted in or under the dash and comparator 3 is mounted under the hood of the automobile with reader 2 and comparator 3 coupled by means of buss line 4. In addition to the pattern recognition system as described with reference to FIGS. 1 through 7, the apparatus of FIG. 8 includes a series of hood lock layers 41, a gas relay 42, a pressure valve 43, an amplifier 44, an amplifier 45, an AND gate 46 (see FIG. 9), an AND gate 47 (see FIG. 9) and the switches 48 and 49. Switch 11 is the power on-off switch. FIG. 9 is a schematic diagram of the circuitry added to the basic system of FIGS. 1 through 6. The AND gates 46 and 47 are not visible in FIG. 8. These AND gates and amplifiers 44 and 45 can conveniently be housed in the housing containing comparator 3 which is not shown separately in FIG. 8.

Hood locking relays 41 when closed lock the hood so that no one can open the hood and gain access to comparator 3 to manipulate the switches 27 of memory 25.

Relay 42 is a gas control relay. When the relay 42 is closed, the flow of gasoline to the carburetor is cut off and, consequently, the automobile engine will not run.

When relay 42 is open, gasoline will flow to the carburetor.

To operate the system of FIG. 8, the owner of the automobile inserts his matrix card 1 into the reader and then turns switch 11 to the "on" position to provide power to the system. Switch 49 which is the gas relay release switch is also turned "on". As is shown in FIG. 9, turning switch 49 to the "on" position connects the switch to a source of positive voltage. With switch 49 in the on position and the proper matrix card in the reader, the two inputs to AND gate 47 are both high, a "1" logic level signal, and AND 47 provides an output signal that is amplified by amplifier 44. The output of amplifier 44 opens relay 42. With relay 42 open, gas flows to the carburetor and the automobile can be started. If an improper card is inserted into the reader, only the input to AND 49 from switch 49 will be high and the input from pattern recognition system 40 will be low. Consequently, AND gate 47 does not provide an output and relay 42 remains closed.

When the automobile is being operated, switch 48 remains in the "off" position since there would be no reason to open the hood. To open the hood, switch 48 is turned "on" and matrix card 1 is inserted into the reader. Under these conditions, assuming the proper card, both inputs of AND gate 46 receive a "1" logic level signal (go high) and AND gate 46 provides an output signal which is amplified by amplifier 45, the output of amplifier 45 opens relays 41 so that the hood can be opened. Thus, the hood is locked and cannot be opened unless the proper matrix card is inserted into the reader. Since the hood can only be opened by the proper card, no one except the holder of the proper matrix card, can gain access to the system of this invention to change the code in comparator 3. Of course, when the hood is open, the card can be removed from the reader and switch 48 can be turned "off". Relays 41 will then close and depending upon the design of the latches on relay 41, these relays may have to be reopened by the matrix card and switch 48 before the hood can again be locked. With the hood open, the code can be changed by changing the positions of the appropriate switches 27.

FIG. 10 illustrates another way in which the pattern recognition system of this invention can be used to prevent the theft of an automobile. As in FIGS. 8 and 9, the basic pattern recognition system of the invention is labelled with the numeral 40. Reader 2 will be mounted inside the automobile and comparator 3 will be mounted under the hood. As in the case with the apparatus of FIG. 8, AND gates 46 and 47 with their associated switches 48 and 49 respectively and amplifiers 44 and 45 are added to the basic system of this invention. Locking relays such as relays 41 of FIG. 8 (not shown in FIG. 10) are also included in the system of FIG. 10 and these relays are opened in the manner described above with reference to FIGS. 8 and 9.

In FIGS. 8 and 9, the output of amplifier 44 is coupled to gas relay 42 whereas in FIG. 10 the output of amplifier 44 is coupled to contact relay 50. Contact relay 50 is connected to the positive terminal of the automobile battery 51. When relay 51 is open, the positive terminal of battery 51 is disconnected from ignition switch 52, voltage regulator 53, alternator 54 and starter motor 55. Therefore, it is apparent that the automobile cannot be started when relay 50 is open.

In FIG. 10 switch 49 functions in combination with pattern recognition system 40 to close relay 50. In FIG. 8, the switch in combination with pattern recognition system 40 controlled the gas relay 42. Since circuitry and switch arrangement in both FIGS. 8 and 10 are the same, identical numerals have been used in both figures for the identical elements, the only difference being, as previously mentioned, the function of the relay connected to the output of amplifier 44. Note, while not shown in FIG. 10, on-off power switch 11 is, of course, part of pattern recognition network 40.

In operation, contact relay 50 is normally open when the automobile is not being operated. To start the engine, the operator inserts his matrix card in the reader and turns on power switch 11. He also turns switch 49 to the "on" position. Under these conditions, the two inputs to AND gate 47 are "1" logic level signals and AND gate 47 provides an output. The output of AND gate 47 is amplified by amplifier 44 and the output of amplifier 44 closes contact relay 50. The automobile can then be started. If switch 49 is in the "off" position or an improperly coded matrix card is used, AND gate 47 will not produce an output signal and relay 50 remains open. If desired, an alarm system, not shown, could be included. The alarm system would be activated when someone tried to use an improper card or turned on switch 49 with an improper matrix card or without any matrix card.

While FIGS. 8, 9 and 10 specifically disclose the pattern recognition system of this invention as being used to protect an automobile, it should be apparent that the system of this invention has numerous applications. For example, the pattern recognition system of this invention can be used with door locks, brief cases, motorcycles, power boats and the like. The circuitry of this invention can be, using integrated circuit techniques, fabricated as a very small package or a series of very small packages. Very little power is required to operate the system. Further, while the invention has been described with reference to two embodiments for the reader and one embodiment for the comparator, it will be obvious to those skilled in the art that various changes and modifications can be made to the embodiments shown and described without departing from the spirit and scope of the invention as set forth in the claims.

What is claimed is:

1. A pattern recognition system comprising:
   a thin card having a matrix array, said card being coded by perforating a plurality of elements of said matrix array in a pattern to be recognized;
   a card reader, said reader having means for receiving said card and producing an electrical signal for every matrix position on said card;
   a comparator including, an matrix array of radiant energy emitting elements said array of radiant energy emitting elements being arranged such that each one of said radiant energy emitting elements matches in number and location, a different one of said elements of said matrix array of said card and an array of radiant energy sensors identical to said array of radiant energy emitting elements, each being sensor optically aligned with a different one of said radiant energy emitting elements of said array of radiant energy emitting elements, said comparator having a pre-set code such that said comparator provides a "1" logic level output signal when said pre-set code in said comparator matches exactly the code on said card when said card is inserted into said reader and provides a "0" logic level output signal when said pre-set code in said comparator and the code in said card do not match exactly when said card is inserted into said reader, said reader providing input signals to said comparator indicative of the code of a card inserted into said reader, an array of Schmitt trigger circuits, means for coupling the said electrical signals from said card reader to a corresponding one of said Schmitt trigger circuits, and means for coupling the outputs of said Schmitt trigger circuits to said comparator.

2. A pattern recognition system as defined in claim 1 wherein said means for coupling electrical signals from said card reader to said array of Schmitt triggers includes buffer circuit means.

3. A recognition system for recognizing a selected permutation pattern in a physical structure carrying a first matrix array of code points, each code point in said first matrix array carrying a presence or absence physical structure in said selected permutation pattern, comprising reader means having a code point sensing matrix array for simultaneously sensing each matrix position in said first matrix array of code points and producing one of two electrical signals corresponding to each code point in said first matrix array, a second matrix array of code points, the code points in said second matrix array having one of two electrical signals at each code point in a permutation pattern corresponding to the selected permutation pattern to be recognized, a third matrix array of comparators corresponding to said sensing matrix array and second matrix arrays for simultaneously comparing the electrical signals at each corresponding matrix point from said sensing matrix array with the electrical signals from said second matrix array at each corresponding matrix point and producing a recognition signal only upon correspondance between the permutation pattern of every matrix point in said sensing matrix array with a permutation pattern in said second matrix array of code points.

4. The invention defined in claim 3 including means for changing the permutation pattern of code points in said second array of code points.

5. In an automobile theft prevention system, the recognition system defined in claim 3, means mounting said reader means in an automobile for access by the user, relay means controlled by said pattern recognition system, and means controlled by said relay for assuring the inoperability of said engine unless the inserted said matrix contains the permutation pattern in said second matrix.

6. The invention defined in claim 5 wherein said means controlled by said relay is a valve element.

7. The invention defined in claim 5 wherein said means controlled by said relay is a gas control relay controlling the flow of gasoline to the carburetor of the engine.

8. The invention defined in claim 5 wherein said automobile has an electrical battery and said means controlled by said relay controls the electrical supply of energy from said battery to the electrical system of said engine.

9. The invention defined in claim 5 including a further relay, and lock means controlled by said relay for controlling access to an enclosed space on said vehicle.

10. The invention defined in claim 9 wherein said enclosed space contains the engine of said automobile and means to change the permutation pattern in said second matrix to change the pattern recognized by said reader.

11. A pattern recognition system comprising:

a thin card having a matrix array, said card being coded by perforating a plurality of elements of said matrix array in a pattern to be recognized;

a card reader, said reader having means for receiving said card and producing an electrical signal for every matrix position on said card;

an matrix array of light emitting diodes, said array of light emitting diodes being arranged such that each one of said light emitting diodes matches in number and location, a different one of said elements of said matrix array of said card and an array of photodiodes identical to said array of light emitting diodes, each photodiode being optically aligned with a different one of said light emitting diodes of said array of light emitting diodes, a plurality of buffer circuits equal in number to the number of said photodiodes of said photodiode array; each one of said plurality of buffer circuits having an input and an output;

a plurality of amplifier circuits equal in number to said plurality of buffer circuits; each one of said amplifiers having an input and an output;

a plurality of Schmitt trigger circuits equal in number to the number of said amplifier circuits, each one of said Schmitt trigger circuits having an input and an output;

means to couple said output of each one of said photodiodes of said photodiode array to said input of a different one of said plurality of buffer circuits;

means to couple said output of each one of said buffer circuits of said plurality of buffer circuits to said input of a different one of said plurality of amplifiers;

means to couple said output of each one of said amplifiers of said plurality of amplifiers to said input of a different one of said plurality of Schmitt trigger circuits;

a comparator, said comparator having a pre-set code such that said comparator provides a "1" logic level output signal when said pre-set code in said comparator matches exactly the code on said card when said card is inserted into said reader and provides a "0" logic level output signal when said pre-set code in said comparator and the code in said card do not match exactly when said card is inserted into said reader, said reader providing input signals to said comparator indicitive of the code of a card inserted into said reader and;

means to couple said output of each one of said plurality of Schmitt trigger circuits to said comparator.

12. A pattern recognition system as defined in claim 11 wherein said comparator comprises:

a plurality of cells equal in number to said plurality of photodiodes of said photodiodes array, each one of said cells being directly associated with a different one of said plurality of Schmitt trigger and having a memory circuit and an associated comparison network.

13. A pattern recognition system as defined in claim 12 wherein each one of said memory circuits of said plurality of cells comprises:

a switch having a first switch contact coupled to ground, a second switch contact coupled to a source of voltage and a switch arm movable between said first and second switch contacts;

an inverter having an input coupled to said switch arm and an output;

a flip-flop circuit having a first input coupled to said switch arm, a second input coupled to said output of said inverter circuit and an output.

14. A pattern recognition system as defined in claim 13 wherein each said comparison network of said plurality of cells comprises:

a first AND gate having a first input coupled to said output of said flip-flop of said associated memory circuit, a second input coupled to said output of said associated Schmitt trigger of said plurality of Schmitt triggers and an output;

an inverted OR gate having a first input coupled to said output of said flip-flop of said associated memory circuit, a second input coupled to said output of said associated Schmitt trigger of said plurality of Schmitt triggers and an output;

an OR gate having a first input coupled to said output of said AND gate, a second input coupled to said output of said inverted OR gate and an output.

15. A pattern recognition system as defined in claim 14 wherein said comparator further comprises a master AND gate having a plurality of inputs, each one of said plurality of inputs of said master AND gate being coupled to said output of said OR gate of a different one of said plurality of cells.

16. A pattern recognition system as defined in claim 14 wherein said comparator further comprises a master AND gate having a plurality of inputs, each one of said plurality of inputs of said master AND gate being coupled to said output of said OR gate of a different one of said plurality of cells.

17. A pattern recognition system as defined in claim 16 wherein said pre-set code in said comparator circuit is determined by the position of said switch arm of each said switch of said plurality of cells with respect to said first and second switch contacts.

18. A pattern recognition system as defined in claim 12 wherein said pre-set code in said comparator circuit is determined by the position of said switch arm of each said switch of said plurality of cells with respect to said first and second switch contacts.

19. A pattern recognition system comprising:

a thin card having a matrix array, said card being coded by perforating a plurality of elements of said matrix array in a pattern to be recognized;

a card reader, said reader having means for receiving said card and producing an electrical signal for every matrix position on said card;

said card reader including an array of sensing points equal in number to the number of elements in said matrix array on said card, each one of said plurality of sensing points corresponding in position with a different one of said elements of said matrix array on said card when said card is inserted into said means for receiving;

an array of sensing point contacts, each one of said sensing point contacts being aligned with a different one of said array of sensing points, respectively;

a comparator coupled to said card reader, said comparator having a pre-set code such that said comparator provides a "1" logic level output signal when said pre-set code in said comparator matches exactly the code on said card when said card is inserted into said reader and provides a "0" logic level output signal when said pre-set code in said comparator and the code in said card do not match exactly when said card is inserted into said reader, means to couple said array of sensing point contacts to said card reader providing input signals to said comparator indicitive of the code of a card inserted into said reader, and wherein said means to couple each one of said array of sensing point contacts to said comparator comprises:

a plurality of logic inverter circuits equal in number to the number of sensing point contacts of said array of sensing point contacts, each one of said plurality of logic inverter circuits having an input and an output;

means to couple each one of said sensing point contacts of said array of sensing point contacts to said input of a different one of said plurality of logic inverter circuits; and means to couple said output of each one of said plurality of logic inverter circuits to said comparator.

20. A pattern recognition system as defined in claim 19 wherein said comparator comprises:

a plurality of cells equal in number to the number of sensing point contacts of said array of sensing point contacts, each one of said cells being directly associated with a different one of said plurality of logic inverter circuits and having a memory circuit and an associated comparator circuit.

21. A pattern recognition system as defined in claim 20 wherein each one of said memory circuits of said plurality of cells comprises:

a switch having a first switch contact coupled to ground, a second switch contact coupled to a source of voltage and a switch arm movable between said first and second switch contacts;

an inverter having an input coupled to said switch arm and an output;

a flip-flop circuit having a first input coupled to said switch arm, a second input coupled to said output of said inverter circuit and an output.

22. A pattern recognition system as defined in claim 21 wherein each said comparison network of said plurality of cells comprising:

a first AND gate having a first input coupled to said output of said flip-flop of said associated memory circuit, a second input coupled to said output of said associated logic inverter circuit of said plurality of logic inverter circuits and an output;

an inverted OR gate having a first input coupled to said output of said flip-flop of said associated memory circuit, a second input coupled to said output of said associated logic inverter circuit of said plurality of logic inverter circuits and an output;

an OR gate having a first input coupled to said output of said AND gate, a second input coupled to said output of said inverted OR gate and an output.

* * * * *

UNITED STATES PATENT AND TRADEMARK OFFICE
CERTIFICATE OF CORRECTION

PATENT NO. : 4,288,780

DATED : September 8, 1981

INVENTOR(S) : Alexander S. Theodoru

Page 1 of 2

It is certified that error appears in the above—identified patent and that said Letters Patent is hereby corrected as shown below:

Column 2, line 12, correct the spelling of "recognition"

Column 4, line 4, delete "9" and after the "photodiode" insert -- 9 --.

Column 4, line 9, "comparator 3" should read

-- Schmitt Trigger 19 --.

Column 5, line 14, "Fig. 4" should read -- Fig. 5 --.

Column 5, line 16, "flip-flop 27" should read

-- flip-flop 29 --

Column 5, line 17, "output 22" should read -- output 20 --.

Column 5, line 38, "gate 35" should read -- gate 34 --.

Column 5, line 46, "card 2" should read -- card 1 --.

UNITED STATES PATENT AND TRADEMARK OFFICE
CERTIFICATE OF CORRECTION

PATENT NO. : 4,288,780

DATED : September 8, 1981

INVENTOR(S) : Alexander S. Theodoru

It is certified that error appears in the above—identified patent and that said Letters Patent is hereby corrected as shown below:

Column 6, line 35, "card 2" should read -- card 1 --.

Column 7, line 17 "AND 49" should read -- AND 47 --.

Delete "claim 15"

On the title page, "Claims 22" should read -- Claims 21 --.

Signed and Sealed this

Fourteenth Day of September 1982

[SEAL]

Attest:

Attesting Officer

GERALD J. MOSSINGHOFF

Commissioner of Patents and Trademarks